United States Patent

Pulley et al.

[11] Patent Number: 5,543,247
[45] Date of Patent: Aug. 6, 1996

[54] HIGH TEMPERATURE CELL ELECTRICAL INSULATION

[75] Inventors: Christopher J. Pulley, Shaker Hts., Ohio; Steven J. Specht, Valdosta, Ga.; Geoffrey Barlow, South Russell, Ohio

[73] Assignee: Northrop Grumman Corporation, Linthicum, Md.

[21] Appl. No.: 323,650

[22] Filed: Oct. 17, 1994

Related U.S. Application Data

[63] Continuation-in-part of Ser. No. 234,070, Apr. 28, 1994, Pat. No. 5,476,734.

[51] Int. Cl.⁶ ................................................. H01M 2/14
[52] U.S. Cl. ...................... 429/129; 429/130; 429/191; 429/199; 429/247
[58] Field of Search ................................. 429/103, 129, 429/247, 191, 199, 130, 210

[56] References Cited

U.S. PATENT DOCUMENTS 3,844,842  10/1974  Sharma et al. .
3,847,675  11/1974  Sharma .
3,988,168  10/1976  Bruneau ................................. 429/129

FOREIGN PATENT DOCUMENTS 56-156675  3/1981  Japan .

*Primary Examiner*—Maria Nuzzolillo

[57] ABSTRACT

An insulator for use in a monopolar cell battery is provided in which the battery includes a first electrode in contact with the case and a second electrode which is not in contact with case. The insulator is a plate which is formed from a higher melting point salt which is provided adjacent the edges of the second electrode. The plate insulates the second electrode from the case. The salt used for the insulator has a melting point that is greater than the operating temperature of the battery.

10 Claims, 2 Drawing Sheets

HIGH TEMPERATURE CELL ELECTRICAL INSULATION

This application is a continuation-in-part of patent application Ser. No. 08/234,070 filed Apr. 28, 1994, now U.S. Pat. No. 5,476,734.

BACKGROUND OF THE INVENTION

1. Field of the Invention

This invention relates to improvements in monopolar batteries, and more particularly to providing electrical insulating elements in a monopolar cell.

2. Description of the Prior Art

In a monopolar cell, such as a lithium-alloy/molten salt/metal sulfide cell, the metallic cell case is typically in contact with one of the cell electrodes, usually the negative electrode. The positive electrode then must be electrically insulated from the metallic cell case. Ceramic materials such as boron nitride, aluminum nitride and magnesium oxide have been used as insulators, but they are relatively expensive. Moreover, if such ceramic insulators crack during assembly or use, the positive electrode may short to the cell case causing cell failure. Furthermore, cracks in the ceramic insulator may create electrolyte paths between the positive electrode and the cell case. If such cracks develop, lithium may be deposited between the positive electrode and the cell case during charging. Accordingly, there is a need for an improved insulator for a monopolar cell.

In patent application Ser. No. 08/234,070, now U.S. Pat. No. 5,476,734 filed Oct. 18, 1993, it was shown that a high melting point salt can be used to prevent the escape of electrolyte from bipolar cells and to prevent intercell leakage currents. A salt or salt mixture having a higher melting point than the electrolyte can be used to form a containment in the bipolar cell. The containment is placed adjacent the periphery of the cell components and may be provided as a packed powder, a fused or melted segment, or a flexible sleeve containing the higher melting point salt.

SUMMARY OF THE INVENTION

An insulator for use in a monopolar cell battery is provided which uses a high melting point salt as the basis of the insulator. In the battery cell, a first electrode is provided which remains in contact with the case of the cell. A second electrode, not in contact with the case, is also provided as is a separator. The battery also contains an electrolyte having a melting point lower than the operating temperature of the battery.

The insulator provided in the above-described battery is preferably in the form of a plate which is provided adjacent the edges of the second electrode. This plate insulates the second electrode from the case. The salt which forms the plate has a melting point that is greater than the operating temperature of the battery.

DESCRIPTION OF THE PREFERRED EMBODIMENT

Figure 3:
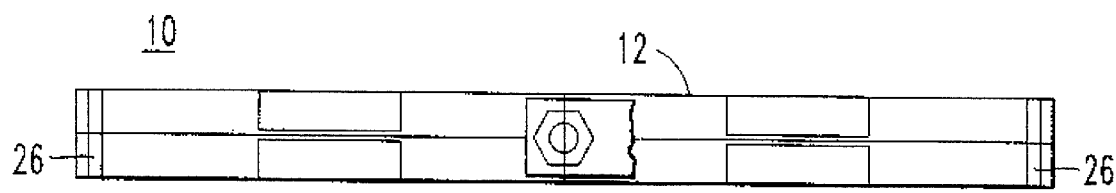
FIG. 3 is a top schematic view of the cell assembly of FIG. 1.
Figure 1:
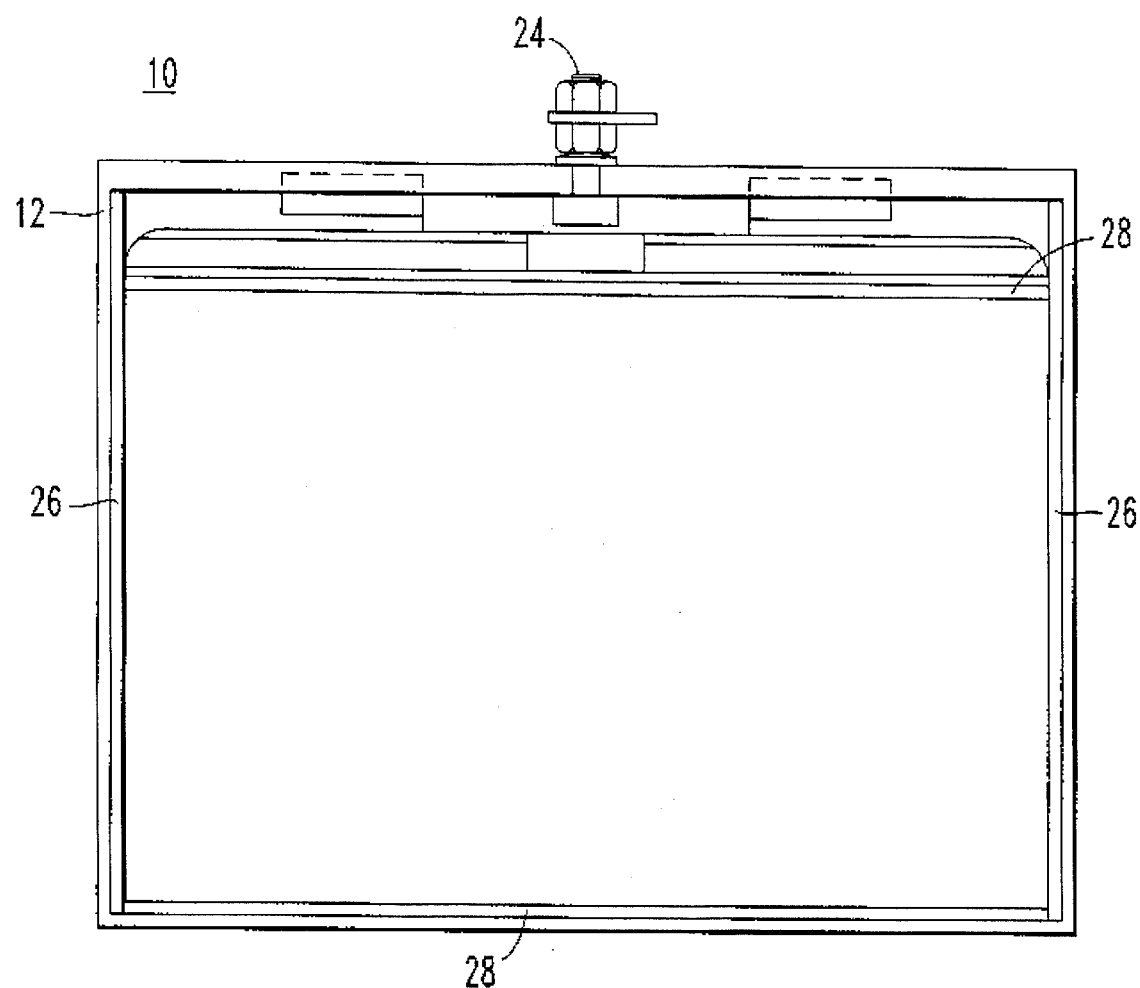
FIG. 1 is a front schematic view of a battery cell assembly including a presently preferred embodiment of the insulator of the present invention.
Figure 2:
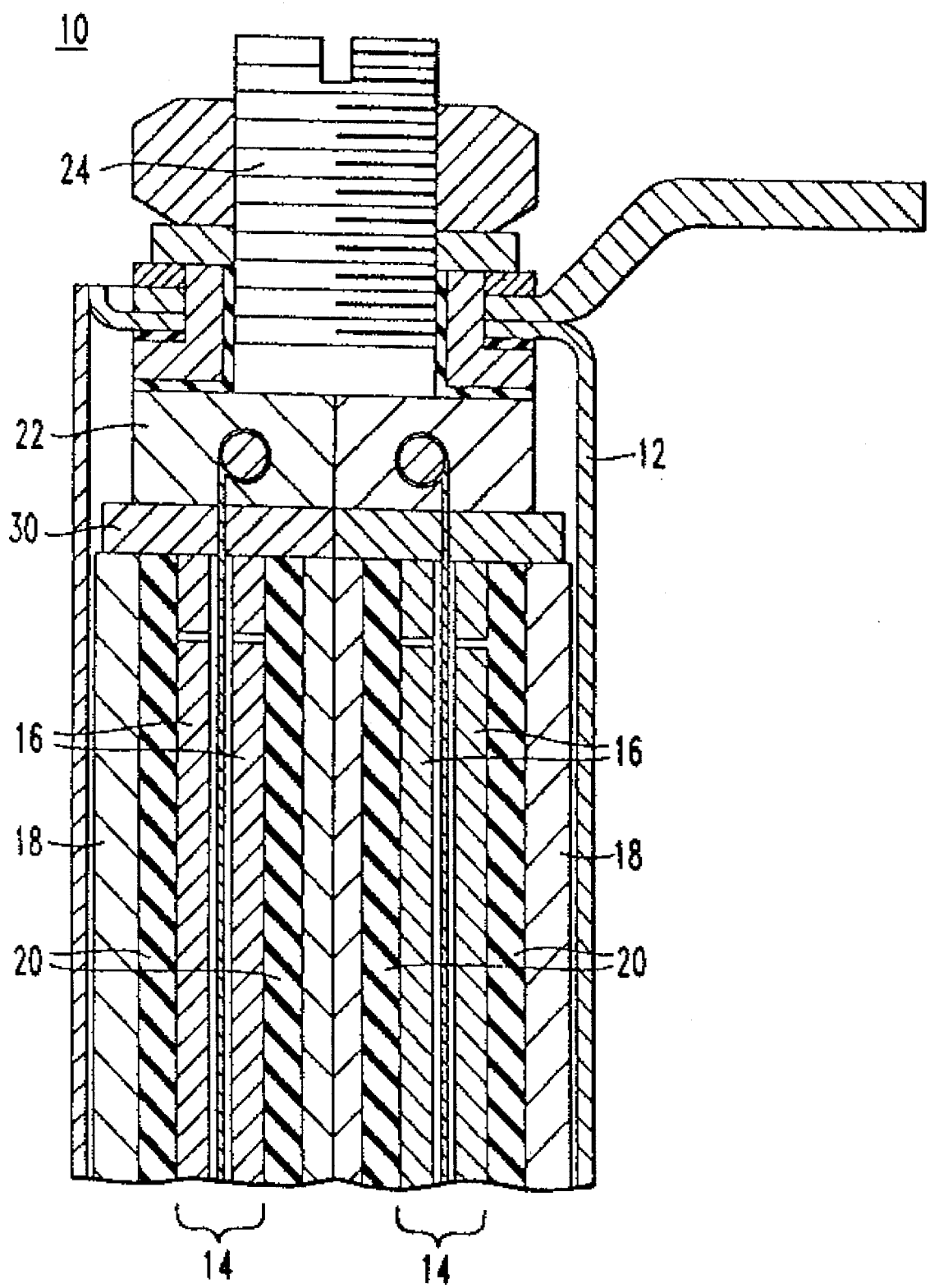
FIG. 2 is a side schematic view of the top portion of the cell assembly of FIG. 1.

FIGS. 1–3 show a typical five-plate cell assembly 10. The cell assembly 10 includes a case 12 into which a pair of electrode plates 14 are provided. Electrode plates 14 include a pair of positive electrodes 16 provided on either side of a positive current collector. Typically, the positive electrodes 16 are connected by means of the positive current collector to a positive terminal 22 which extends out of the case 12 at stud 24. The negative electrodes 18 of electrode plates 14 are electrically connected to case 12. An insulator is needed to separate the positive electrodes 16 of electrode plates 14 from the case 12.

High melting point salts are low cost electrical insulation materials which have other advantageous properties for use in monopolar high temperature cells. High melting point salts, which have a higher melting point than the active temperature of the battery, have self-healing and electrolyte-immobilization characteristics which allow them to seal small cracks in the insulator, thereby preventing failure of the cell due to formation of lithium or physical movement of the positive electrode material through the crack to form a short. The electrolyte immobilization properties of the high melting point salt also benefit the monopolar cell by preventing loss of electrolyte from the active materials in the separator.

As shown in FIGS. 1–3, insulators in the form of flat plates 26 and 28 are provided adjacent to the edges of the active positive electrodes 16 and provide electrical isolation between the electrodes 16 and the cell case 12 which is at a negative potential. Such insulators are approximately 0.055 inches thick and 0.5 inches wide and as long as the adjacent edge of the positive electrodes 16. The insulators are formed from a high melting point salt such as lithium fluoride. Lithium fluoride insulating strips 26 and 28 can be fit tightly between the edges of the cell case 12 and the positive electrodes 16 around the perimeter of the positive electrodes 16. In addition, a similar insulator 30 can be provided at the top of electrodes 16 and 18 below the terminal 22.

The electrical insulation concept has been incorporated into lithium-alloy/molten salt/iron disulfide cells. The edge insulation functioned as anticipated. Cells which incorporate such insulators meet the design performance goals for batteries.

The shape of the high melting point salts can be any form which provides electrical isolation between the active electrodes 16 and/or between the positive electrodes 16 and the case 12. The example shown in FIGS. 1–3 are for a plate provided adjacent the edges of the positive electrodes 16. Alternatively, the insulator plates can be provided directly on the case 12 by any standard means of attachment. Such insulators can also be provided directly on the edges of the positive electrode 16. Finally, such insulators can also be provided on the sides of the case 12 by plasma spraying, solvent deposition, compacting higher melting point salt powder, and melting higher melting point salt powder on the sides of the case 12. When applying the insulator to the ends and bottom of the case 12, the longer sides of the case 12 which are in contact with the negative electrodes must be masked in order to prevent application of the salt thereto.

The insulators can be manufactured by pressing, forming, casting, molding, sintering or any other suitable method to form the desired shape from the powdered salt materials.

The high melting point salt can be any salt or mixture of salts which has a melting point higher than the electrolyte in cell operating temperature and which reacts with the electrolyte to form a higher melting mixture which solidifies at the cell operating temperature. Typical salts include lithium fluoride, lithium chloride, lithium bromide, potassium fluoride, potassium chloride, potassium bromide, sodium fluoride, sodium chloride, sodium bromide, and mixtures of these and other salts.

While certain present preferred embodiments have been shown and described, it is distinctly understood that the invention is not limited thereto but may be otherwise embodied within the scope of the following claims.

We claim:

1. An insulator for use in a battery, the battery being of the type formed of a monopolar cell having a first electrode in contact with the case of said cell and a second electrode not in contact with said case, and containing an electrolyte having a melting point lower than an operating temperature of the battery, the insulator comprising:
   a plate formed from a higher melting point salt provided adjacent the edges of said second electrode but not affixed to said second electrode, said plate insulating said second electrode from said case, the salt having a melting point that is greater than the operating temperature of the battery.

2. The insulator of claim 1 wherein the higher melting point salt is in the form of a powder.

3. The insulator of claim 2 wherein the higher melting point salt powder is packed.

4. The insulator of claim 1 wherein the higher melting point salt is formed as a single molded piece.

5. The insulator of claim 4 wherein the insulator is formed as at least one molded piece by heating the higher melting point salt to a temperature above its melting point before placing the insulator in the cell.

6. An insulator for use in a battery, the battery being of the type formed of a monopolar cell having a first electrode in contact with the case of said cell and a second electrode not in contact with said case, and containing an electrolyte having a melting point lower than an operating temperature of the battery, wherein the insulator is formed as a plurality of plates provided on the top, bottom and sides of said case, said plurality of plates being provided adjacent the edges of said second electrode, said plurality of plates insulating said second electrode from said case, the salt having a melting point that is greater than the operating temperature of the battery.

7. The insulator of claim 1 wherein the higher melting point salt is mixed with inert materials.

8. The insulator of claim 1 wherein the higher melting point salt is selected from the group consisting of lithium fluoride, lithium chloride, lithium bromide, lithium iodide, sodium fluoride, sodium chloride, sodium bromide, sodium iodide, potassium fluoride, potassium chloride, potassium bromide, potassium iodide, and combinations thereof.

9. The insulator of claim 1 wherein the higher melting point salt is applied on the top, bottom and ends of said case by one of plasma spraying, solvent deposition, compacting higher melting point salt powder and melting higher melting point salt powder.

10. An insulator for use in a battery, the battery being of the type formed of a monopolar cell having a first electrode in contact with the case of said cell and a second electrode not in contact with said case, and containing an electrolyte having a melting point lower than an operating temperature of the battery, the insulator comprising:
   a plate formed from a higher melting point salt provided adjacent the edges of said second electrode, said plate insulating said second electrode from said case, the salt having a melting point that is greater than the operating temperature of the battery.

* * * * *